3,110,707
PRODUCTION OF POLYMERS OF OLEFINES
Ettore Bua, Padua, Luciano Luciani, Ferrara, and Alessandro Negromanti, Milan, Italy, assignors to Montecatini Società Generale per l'Industria Mineraria e Chimica, Milan, Italy
Filed Nov. 1, 1956, Ser. No. 619,806
Claims priority, application Italy Nov. 8, 1955
11 Claims. (Cl. 260—93.7)

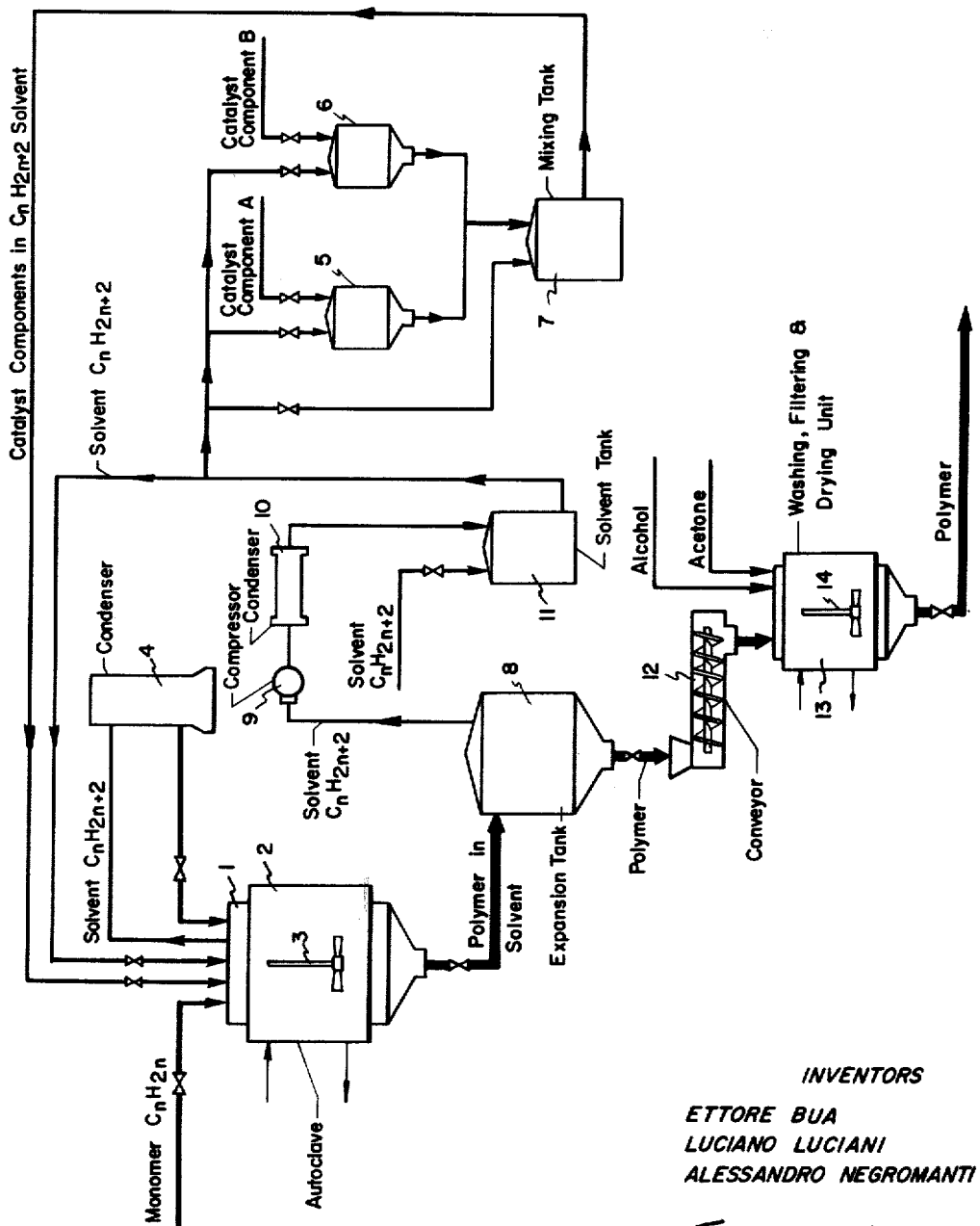

This invention relates to improvements in the production of substantially linear polymeric olefines. More particularly the invention relates to improvements in the production of substantially linear, crystallizable high polymers of olefines of the formula $$CH_2{=}CHR$$

where R is hydrogen or an alkyl radical containing 1 to 16 carbon atoms. Still more particularly, the invention relates to improvements in the production of substantially linear, crystallizable high polymers of ethylene and propylene.

Processes for the production of the high polymers, for example of crystallizable high polymers of ethylene and propylene, have been disclosed in which the polymerization is carried out in an inert high-boiling hydrocarbon solvent with the aid of a catalyst obtained from an organo-metallic compound, such as an aluminum alkyl, and a compound of a transition metal of groups IV to VI of the periodic table, such as titanium halide.

The high boiling or relatively high boiling inert hydrocarbon solvents previously disclosed for use in the polymerization of the olefines included hexane, n-heptane, hydrogenated diesel oil, toluene, xylene, paraffinic oil, benzene, chlorobenzenes, tetralin and so on.

The use of those solvents generally results in good yields of polymers having satisfactory appearance and properties. However, those solvents do not lend themselves readily to the recovery and re-use which are desirable for economical production of the polymers on a large scale.

In fact, in the methods previously disclosed, at the end of the polymerization reaction, the polymer is freed from the inorganic components of the catalyst by treating it with alcohols which react with the organo-metallic compounds and solubilize the reaction products formed. The treatment with alcohol is carried out before removing the polymer from the reaction vessel such as an autoclave, or after the polymer has been separated from the greater portion of the reaction solvent by filtration. In the latter instance, the polymer retains a quantity of solvent approximately equal to its weight. Since all or a portion of the hydrocarbon solvent is thus mixed with alcohol, it is necessary, in order to re-use the inert hydrocarbon solvent in subsequent polymerization runs, to separate it from the alcohol mixed with it and which, if not removed, would react with the catalyst and render the same inactive.

The separation of the alcohol from the inert hydrocarbon solvent requires resort to accurate refining methods which vary depending on the particular solvent used. For example, if the inert hydrocarbon solvent is a kerosene of paraffinic character, it is necessary to carry out repeated distillations of the mixture of solvent and washing alcohol, treat the distillate with sulphuric acid, wash with water, and finally separate and dehydrate the inert solvent. These operations are expensive, time-consuming, and lead to unavoidable losses of solvent.

An object of the present invention is to provide an improved process for producing the polymers utilizing solvents which can be readily recovered and recycled for use in a subsequent polymerization.

This and other objects of the invention are accomplished by carrying out the polymerization of the olefines with the aid of the catalyst obtained from the organo-metallic compound and transition metal compound, in an inert hydrocarbon solvent which is gaseous at room temperature, i.e., such solvents having boiling points below room temperature and in general boiling in the range +0.6° C. to −42° C., under normal atmospheric pressure.

The inert hydrocarbon solvents used in the present improved method of making the polymers include propane, n-butane and isobutane. Mixtures of such paraffinic hydrocarbons may be used.

The polymerization in these solvents is carried out at temperatures and pressures at which the solvents remain in the liquid condition, and usually at temperatures between 50° C. and 100° C.

Polymerization of the olefines in the presence of the low-boiling solvents that are normally gaseous at room temperature, under conditions such that the solvents remain in the liquid state during the polymerization, has a number of extremely important practical advantages. The inconveniences resulting from use of the high boiling solvents previously used are eliminated, without affecting the course of the polymerization or the properties of the polymers obtained, which are high polymers having the same appearance, structure and properties as the polymers obtained when the polymerization is carried out in the high boiling solvents. In other words, the polymeric propylene obtained by the present method is a linear, regular, head-to-tail polymer which may be crystallizable and similar to such polymers disclosed and claimed in the pending applications of G. Natta et al., Ser. Nos. 514,097, 514,098, 514,099, and 550,164, and have the isotactic structure illustrated by model in said applications.

Another advantage of the present method is that the inert hydrocarbon solvent can be directly and immediately recycled for re-use. Thus, when the polymerization reaction is ended, it is sufficient to expand the solvent under normal atmospheric pressure, condense it, and recycle it to the polymerization reactor without subjecting it to distillation or refining steps. The presence of small amounts of gaseous, unchanged monomeric olefine in the solvent vapors does not present difficulties, since the gaseous monomer normally can be recycled to the polymerization reactor with the solvent.

The use of the readily volatile, low boiling solvent also is advantageous during the polymerization reaction for when an autoclave provided with a refluxing condenser is used as the polymerization reactor, the heat of reaction is removed in vaporizing the solvent, which refluxes back to the reaction zone. This provides a simple, efficient thermal control of the process and eliminates difficulties of temperature control which may be encountered particularly when an autoclave of considerable size is employed or due to decrease in the efficiency of heat exchange between the reactor and a cooling jacket associated with it, as the polymer is formed.

A still further advantage of the present method resides in the fact that the low-boiling solvent is removed from the polymer before the latter is treated with alcohol for purification. This permits of the use of methyl alcohol whereas in the earlier method in which the alcohol was added to the polymer in the presence of the inert solvent, it was necessary to select an alcohol readily miscible with the solvent, the alcohol selected for use varying with the particular high boiling solvent mixed with the polymer. The use of methyl alcohol for purifying the polymer has the additional advantage that the alcohol can be removed from the polymer by simple distillation and without requiring special washing treatments.

A further advantage gained by carrying out the polymerization in the solvents having boiling points below room temperature and in the range stated is that removal of the solvent from the polymer does not necessitate heating of the latter, which heating may be undesirable since it may result in melting of low polymers present in the crude polymerizate and the formation of agglomerates the presence of which would complicate further purification of the polymer. It is sufficient, as noted above, to reduce the pressure on the polymer solvent mixture so that the solvent can expand, and to then compress and condense it, and cycle it back to the reactor.

The polymer remaining after the solvent removal is very finely divided. This facilitates greatly the purification with methyl alcohol or the like. The final polymers obtained are, therefore, particularly poor in ashes.

The present method can be carried out with the use of apparatus as shown in the accompanying drawing in which the single FIGURE is a schematic representation.

Referring to the drawing, there is shown at 1 a pressure-resistant autoclave provided with a heat-exchange jacket 2 and a stirrer 3, and having associated therewith a refluxing condenser 4. The catalyst component (A) which may be, for instance, titanium tetrachloride is measured into vessel 5 from which, after mixing with the low-boiling inert solvent, it is forwarded to the mixing vessel 7. Catalyst component (B) which may be an aluminum alkyl like aluminum triethyl is measured into vessel 6 and after mixing with the inert low-boiling solvent therein, is also forwarded to vessel 7. Vessels 5, 6 and 7 are maintained under a pressure such that the low-boiling paraffinic hydrocarbon is liquid. The mixture of catalyst and solvent is fed from vessel 7 to the autoclave 1, by means of a suitable pump (not shown). The olefine to be polymerized is fed continuously into the autoclave 1. After the polymerization has been completed, the paraffinic hydrocarbon being liquid throughout at the pressure employed, the resulting suspension of the polymer in the solvent containing catalyst impurities is sent to the expansion tank 8, in which it is subjected to reduced, preferably normal atmospheric pressure which permits expansion of the paraffinic hydrocarbon and any unchanged monomeric olefine. The expanded low-boiling solvent is led off to the compressor 9 and then to the condenser 10, from which, after removal of any uncondensed portion and recycling (to autoclave 1) of any unreacted gaseous monomeric olefine, it flows into the storage vessel 11 and is recycled to autoclave 1 as desired or required. Controlled amounts of the recovered solvent proceeding from vessel 11 may be diverted to vessels 5 and 6 for mixing with the catalyst components.

The polymer, freed from the polymerization solvent, is withdrawn from expansion tank 8 and, by means of the screw conveyor 12, as shown, or of a suitable pneumatic system, is fed into tank 13 equipped with stirrer 14, and in which the polymer is washed with alcohol, then with acetone, filtered from the wash liquid and dissolved impurities and dried. The purified, dry polymer is then forwarded to a suitable collecting vessel.

Various modifications may be made. Thus, the suspension of the polymer in the low-boiling volatile paraffinic hydrocarbon can be passed directly from autoclave 1, to vessel 13, and separated from the solvent by filtration, the solvent, in that case, being decompressed in the filter and recycled to the autoclave.

The following examples are given to illustrate the invention, it being understood that these examples are not intended as limitative.

Example I

Using apparatus as shown in the drawing, 0.5 g. of diethyl aluminum chloride was added to a stainless steel autoclave of 400 cc. capacity in an atmosphere of ethylene. Subsequently, 0.75 g. $TiCl_3$ was added, followed by the addition of 700 ccs. of liquid butane. The temperature was brought to 75° C., while stirring the autoclave, and the ethylene was introduced, the pressure being maintained at 15 atms., so that the butane remained liquid. After 6 hours, the autoclave was cooled, the suspension of the polyethylene in the liquid butane was sent to the expansion tank, and the butane and ethylene were recovered for recycling as described. The powdery polyethylene was forwarded to vessel 13 and 100 ccs. of butyl alcohol were added. After agitating the mass for one hour at 50° C., it was filtered and the polymer was washed with acetone.

60 gms. of finely divided polyethylene were obtained. The polymer appeared highly crystalline at an X-ray examination, had a molecular weight of about 60,000 and could be molded to clear plates. The butane recovered was recycled for use in polymerizing further amounts of olefine under the same conditions. The results obtained using the recycled butane were the same as described above.

Example II

The apparatus illustrated in the drawing was used. The catalyst as in Example I was introduced into the autoclave. Then 100 ccs. of liquid propane were added. The temperature was raised to 75° C., while agitating the autoclave, and the introduction of ethylene was started, the pressure being maintained at 60 atms. After ten hours, the autoclave was cooled, the suspension of polyethylene in the liquid propane was forwarded to the expansion tank 8, and the propane and gaseous monomer were recovered for recycling. The polymer was treated as in Example I. 60 g. of a finely divided polymer were obtained. The polymer appeared highly crystalline at an X-ray examination, had a molecular weight about 50,000 and could be molded to clear plates.

Example III 8 g. of $TiCl_3$ and then 12.5 g. of diethyl aluminum chloride were introduced under nitrogen into an autoclave of 2000 ccs. capacity. 480 cc. of butane were then added and the mixture was stirred at room temperature for 30 minutes. Thereafter 394 g. of 80% commercial propylene were added, the temperature was brought to 75° C., and the mixture was agitated for 10 hours at that temperature, the butane remaining liquid. The autoclave was then cooled, the gases vented as described, and the polymer was washed. 290 g. of polymer were obtained (yield based on pure propylene, 92%). The solid polymer obtained (280 g.) appears highly crystalline at an X-ray examination and has a molecular weight of about 200,000.

Example IV

Using apparatus as in the drawing, the autoclave was filled with catalyst as in Example III. 480 ccs. of liquid propane were introduced and the mixture was agitated at room temperature for 30 minutes. 380 g. of 87.6% commercial propylene were added, and the polymerization and after-treatment were carried out as in Example III, the propane being maintained in liquid phase. 300 g. of polymer were obtained (yield based on pure propylene, 90%). The solid polymer obtained (268 g.) appears highly crystalline at an X-ray examination and has a molecular weight of about 160,000.

Example V

Using an apparatus similar to the one shown in the drawing, 2000 g. of 90% commercial propylene were polymerized with the aid of a catalyst obtained from 45 g. $TiCl_3$ and 70 g. aluminum diethyl monochloride, using 3000 cc. liquid propane as a solvent. After polymerization under the conditions indicated in Example III, the suspension of the polymer in liquid propane was sent to the expansion tank and the solvent recovered for recycling. The polymer was then forwarded to vessel 13, where it was washed with a large amount of methanol; the suspension was then filtered and the alcohol distilled. 1850 g. of polypropylene were obtained, highly crystalline at the X-rays, and having a molecular weight of approximately 180,000.

At the start of operations, the catalyst components A and B, and the low boiling solvent to be used as the polymerization medium may be introduced directly into the autoclave. However, after the process has been initiated, the fresh amounts of the catalyst components are preferably introduced into vessels 5 and 6, respectively, together with a portion of the hydrocarbon solvent at least some of which may be solvent recovered from the expansion tank 8.

The process is also useful in the polymerization of other higher olefines such as butene-1 and pentene-1.

The process may be conducted on a continuous scale. However, it is within the scope of the invention to produce the polymeric olefines on a batch basis, it being new per se to conduct the polymerization with the aid of the catalysts obtained from the organo-metallic and transition metal compounds in a paraffinic hydrocarbon boiling at +0.6° C. to —42° C. and normally gaseous at room temperature.

In the same way as when the high boiling hydrocarbon solvents are used, the products obtained by polymerizing the higher olefines, e.g., propylene, are linear, regular head-to-tail polymers. The crude polymerizates obtained using catalyst on the basis of solid, crystalline compounds of transition metals, such as TiCl₃, as shown in Examples III to V, are usually rich in crystalline polymers made up of isotactic macromolecules. The amounts of amorphous polymers which may be present can be separated by extraction of the polymerizates with solvents such as acetone. When using catalysts on the basis of liquid compounds of transition metals, such as TiCl₄, VOCl₃, etc. there are usually obtained mixtures richer in amorphous polymers, which can be fractionated by extraction with solvents, such as acetone, ether and n-heptane into amorphous, partially crystalline and very highly crystalline polymers consisting at least prevailingly of isotactic macromolecules as defined by Natta et al.

Both the amorphous and crystalline polymers of ethylene and of the higher alpha-olefines obtained by the present method are linear, as shown by their infrared spectra. In the case of the propylene polymers, for example, both the amorphous and crystalline polymers have similar infra-red spectra which are completely different from the infra-red spectra of the known branched polypropylene, i.e., polypropylene in which the branches are longer than the —CH₃ group (R in the general formula CH₂=CHR).

The polyethylene produced by the present method is, in general, similar to the polyethylene described in Belgian Patent No. 533,362. The polymeric higher olefines, e.g., polypropylene by the present method are similar to the polymers, disclosed in the pending applications, supra, of G. Natta et al., including Ser. No. 514,099, filed June 8, 1955, and have the same properties and uses as those polymers. That is to say, the polymeric alpha-olefines comprise the structure which has been termed "isotactic" by G. Natta.

The compound of a transition metal of groups IV to VI of the periodic table used in perparing the catalyst is preferably a halide of such metals as titanium, zirconium, hafnium, thorium, vanadium, tantalum, niobium, chromium, molybdenum, tungsten and uranium.

The metallo-organic compound which is the other catalyst-forming component comprises a substance or mixture of substances selected from the group consisting of simple and complex compounds the molecules of which contain an element from the group forming the 1st to 3rd columns of the periodic table. Thus, the metallo-organic compound may be a compound of beryllium, magnesium, zinc and other elements of the 2nd column, or a compound of aluminum, gallium and other elements of the 3rd column.

The valencies of the aforesaid elements are linked to the same or different alkyl radicals containing 1 to 16 carbon atoms. One of the valencies of said element may be satisfied by halogen or by alkoxy radicals containing, e.g., 2 to 4 carbon atoms, such as ethoxy, butoxy, etc. Typical metallo-organic compounds which may be used include aluminum trialkyls, e.g., aluminum triethyl, monochlorodialkyl aluminum and zinc dialkyls.

The molar ratio of the transition metal compound to the metallo-organic compound used in forming the catalyst may be from 1:1 to 1:10, usually preferably from 1:2 to 1:6.

The reactor (autoclave 1 in the drawing) should be previously thoroughly dried and evacuated before the process is set in operation because it is of general advantage to carry out the reaction in the absence of oxygen and water. This is true, also, of vessels 5, 6 and 7.

The olefine is preferably dried carefully before it is pumped into the reactor.

Since some variations and modifications may be made in carrying out the process of the invention without departing from the spirit and scope thereof, it will be understood that it is not intended to limit the invention except as it is defined in the appended claims.

What is claimed is:

1. In a process in which olefins selected from the group consisting of ethylene and propylene are polymerized to substantially linear, crystallizable high polymers, in an inert liquid hydrocarbon medium and in contact with a catalyst obtained by mixing a chloride of titanium with an aluminum alkyl compound, and the crude reaction product comprises a slurry of the polymer in the hydrocarbon solvent, the improvement which consists essentially in effecting the polymerization of the olefin in contact with the catalyst in an inert hydrocarbon medium consisting essentially of at least one paraffinic hydrocarbon having a boiling point under normal pressure between +0.6° and —42° C. and selected from the group consisting of propane, n-butane and iso-butane, in a polymerization zone at a selected temperature between 50° C. and the critical temperature of the paraffinic hydrocarbon and under a pressure such that at the selected temperature in said range the paraffinic hydrocarbon is in the liquid state during the polymerization of the olefin, to obtain a slurry of the polymer in the liquid paraffinic hydrocarbon, discharging the slurry from the polymerization zone to an expansion zone in which the polymer is separated from the liquid paraffinic hydrocarbon and any unpolymerized olefin by abrupt expansion of the paraffinic hydrocarbon and unpolymerized olefin under normal pressure, and then treating the substantially dry, finely divided polymer remaining after the abrupt expansion of the paraffinic hydrocarbon with an alcohol to remove catalyst residues therefrom.

2. The improvement according to claim 1, characterized in that the paraffinic hydrocarbon is propane.

3. The improvement according to claim 1, characterized in that the paraffinic hydrocarbon is n-butane.

3. The improvement according to claim 1, characterized in that the paraffinic hydrocarbon is iso-butane.

5. The improvment according to claim 1, characterized in that the olefin is ethylene.

6. The improvement according to claim 1, characterized in that the olefin is propylene.

7. The improvment according to claim 1, characterized in that the olefin is ethylene and the catalyst is obtained by mixing titanium tetrachloride with diethyl aluminum chloride.

8. The improvment according to claim 1, characterized in that the olefin is propylene and the catalyst is obtained by mixing titanium trichloride with the aluminum alkyl compound.

9. The improvement according to claim 1, characterized in that the catalyst is obtained by mixing a hydrocarbon-insoluble, substantially solid, highly crystalline chloride of titanium with an aluminum alkyl compound in a molar ratio of 1:1 to 1:6, and wherein the olefin is polymerized to a substantially linear polymerizate consisting at least prevailingly of isotactic macromolecules.

10. The improvement according to claim 1, characterized in that the olefin is propylene, the catalyst is obtained by mixing highly crystalline titanium trichloride with triethyl aluminum in a molar ratio of 1:1 to 1:6, and the propylene is polymerized to highly crystallizable polypropylene consisting prevailingly of isotactic macromolecules.

11. The improvement according to claim 1, characterized in that the olefin is propylene, the catalyst is obtained by mixing highly crystalline titanium trichloride with triethyl aluminum, in a molar ratio of 1:1 to 1:6, the paraffinic hydrocarbon diluent is propane, the polymerization is carried out at a temperature of 50° C. to 96.5° C., and the propylene is polymerized to substantially linear polypropylene consisting prevailingly of isotactic macromolecules.

References Cited in the file of this patent

UNITED STATES PATENTS

| | | |
|---|---|---|
| 2,600,821 | Wrightson | June 17, 1952 |
| 2,691,647 | Field et al. | Oct. 12, 1954 |
| 2,824,089 | Peters et al. | Feb. 18, 1958 |
| 2,827,447 | Nowlin et al. | Mar. 18, 1958 |
| 2,858,902 | Cottle | Nov. 4, 1958 |
| 2,862,917 | Anderson et al. | Dec. 2, 1958 |

FOREIGN PATENTS

| | | |
|---|---|---|
| 533,362 | Belgium | May 16, 1955 |

UNITED STATES PATENT OFFICE
CERTIFICATE OF CORRECTION

Patent No. 3,110,707 November 12, 1963

Ettore Bua et al.

It is hereby certified that error appears in the above numbered patent requiring correction and that the said Letters Patent should read as corrected below.

Column 6, line 54, for "3." read -- 4. --.

Signed and sealed this 28th day of April 1964.

(SEAL)
Attest:
ERNEST W. SWIDER

Attesting Officer

EDWARD J. BRENNER
Commissioner of Patents